(12) United States Patent
Kishida (10) Patent No.: US 7,334,619 B2
(45) Date of Patent: Feb. 26, 2008

(54) PNEUMATIC TIRE WITH BLOCKS HAVING ZIGZAG SIPES

(75) Inventor: Masahiro Kishida, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 41 days.

(21) Appl. No.: 11/258,064

(22) Filed: Oct. 26, 2005

(65) Prior Publication Data

US 2006/0086445 A1  Apr. 27, 2006

(30) Foreign Application Priority Data

Oct. 27, 2004  (JP) .............................. 2004-312753

(51) Int. Cl.
*B60C 11/12* (2006.01)
(52) U.S. Cl. ..................... 152/209.21; 152/209.23; 152/DIG. 3; 152/902
(58) Field of Classification Search ........... 152/209.18, 152/209.21, 209.23, DIG. 3, 902
See application file for complete search history.

(56) References Cited

U.S. PATENT DOCUMENTS

| | | | | |
|---|---|---|---|---|
| 4,794,965 | A * | 1/1989 | Lagnier | 152/DIG. 3 |
| 5,350,001 | A * | 9/1994 | Beckmann et al. | 152/DIG. 3 |
| 5,783,002 | A * | 7/1998 | Lagnier | 152/DIG. 3 |
| 2003/0029537 | A1* | 2/2003 | Iwamura | 152/209.18 |
| 2004/0134579 | A1 | 7/2004 | Tanaka | |
| 2005/0121124 | A1* | 6/2005 | Tsubono | 152/209.18 |
| 2005/0150581 | A1* | 7/2005 | Kishida | 152/209.18 |
| 2005/0211354 | A1* | 9/2005 | Shinmura et al. | 152/209.18 |
| 2006/0169377 | A1* | 8/2006 | Hashimoto et al. | 152/DIG. 3 |

FOREIGN PATENT DOCUMENTS

| | | |
|---|---|---|
| EP | 1 277 599 A2 | 1/2003 |
| EP | 1 555 142 A2 | 7/2005 |
| JP | 2002-321509 | * 11/2002 |
| JP | 2003-25812 A | 1/2003 |
| WO | WO-2005/030502 A1 | 4/2005 |

* cited by examiner

*Primary Examiner*—Steven D. Maki
(74) *Attorney, Agent, or Firm*—Birch, Stewart, Kolasch & Birch, LLP (57) ABSTRACT

A pneumatic tire comprising a tread portion 2 having blocks 7 each provided with sipeings 10, wherein each sipeing 10 has an opening having a zigzag portion 11 in its opening edge shape J at a block surface S, and opposing wall surfaces in the depth direction Ff which have zigzag displacement portions which are displaced toward one end of the longitudinal direction Fn of the opening and the other end and which are alternately repeated while substantially maintaining the opening edge shape J in the depth direction, and wherein each sipeing 10 satisfies the following equations,

$$W1 \geq W2 \quad (1)$$

and $$0.7 \times W2 \geq W3 > 0, \quad (2)$$

in which W1, W3 and W2 are displacement amounts of a zigzag displacement portion 15U located on the block surface side, a zigzag displacement portion 15L located on the sipeing bottom side and an intermediate zigzag displacement portion 15M in a direction Fv perpendicular to the longitudinal direction Fn, respectively.

4 Claims, 9 Drawing Sheets

PRIOR ART

PNEUMATIC TIRE WITH BLOCKS HAVING ZIGZAG SIPES

BACKGROUND OF THE INVENTION

The present invention relates to a pneumatic tire which includes a plurality of sipeings provided side-by-side in a block, and which can be employed as a studless tire suitable for running on an ice and snow road surface.

In the pneumatic tire, in order to enhance the running performance on an ice and snow road surface, a block provided in a tread portion is formed with a large number of sipeings. By increasing a road surface scratching force (edge effect) obtained by the edge of the sipeing, the driving force and braking force on the ice and snow road are secured. If the number of sipeings is increased, however, the degree of falling down of becomes large. As a result, if the edge effect does not function effectively, and the running performance on the ice road is deteriorated.

Figure 9:
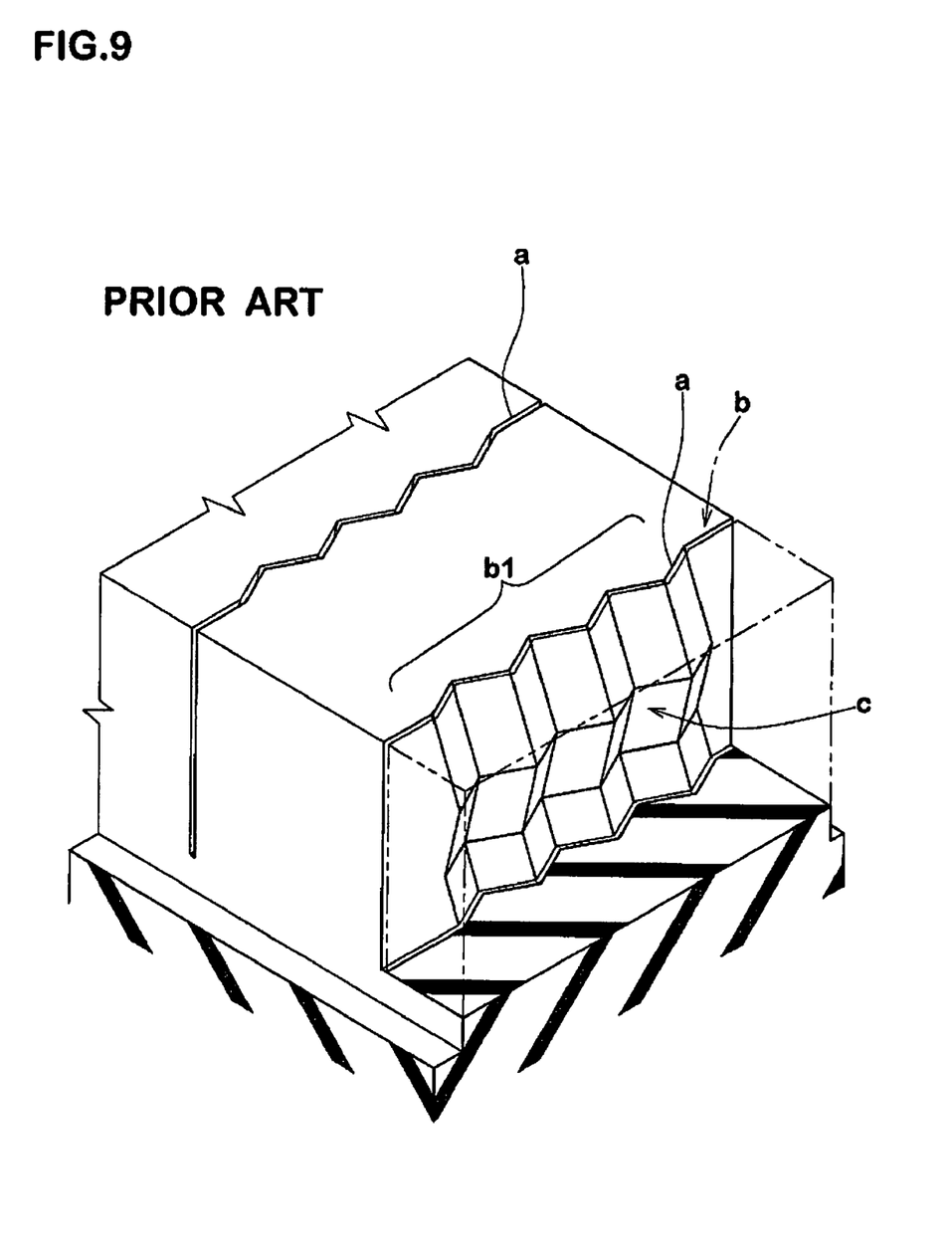
FIG. 9 is a perspective view showing a wall surface of a conventional sipeing of MIURA-ori structure.

Thereupon, to prevent the block from excessively fall, a zigzag type sipeing structure as shown in FIG. 9, is proposed in Japanese published patent application 2003-25812.

In this sipeing structure, its wall surface configuration of sipeing is a kind of so called MIURA-ori structure (MIURA folding manner). In the MIURA-ori structure, an opening edge shape b of the sipeing a which opens at a block surface has a zigzag portion b1. From the block surface toward the sipeing bottom, the zigzag portion b1 is displaced toward one side and the other side by turns in a longitudinal direction of the sipeing while maintaining the zigzag shape. Such a sipeing a forms a three dimensional concavo-convex 3D crooked curved surface comprising parallelograms. With this, concavo portions and convex portions of opposed wall surfaces of the sipeing a mesh each other so that it is possible to effectively prevent the block from falling.

Further, the sipeing a has the same zigzag shape in each depth position, a sipeing forming knife blade in a tire vulcanization mold can be pulled out from the tire easily, and it is possible to suppress the producing efficiency of the tire, and to suppress damage such as bending of the knife blade.

BRIEF SUMMARY OF THE INVENTION

The present invention was completed by analyzing what kinds of effect on the block rigidity, pulling easiness and bending of the knife blade arise by the displacement amount of the sipeing of the MIURA-ori structure in the longitudinal direction, and a direction perpendicular to the longitudinal direction.

That is, the present invention relates to an improvement of a sipeing of the MIURA-ori structure, and it is an object of the invention to provide a pneumatic tire capable of more smoothly pulling the knife blade from the tire while highly securing the suppressing effect on falling of the block. It is another object of the invention to provide a pneumatic tire capable of further enhancing the producing efficiency of the tire and enhancing the suppressing effect of bending and damage of the knife blade.

The present invention provides a pneumatic tire having blocks which are divided by tread grooves and in which a plurality of sipeings are provided side-by-side, wherein the sipeing has a zigzag portion which extends in a zigzag form while repeating mountains and valleys, and forms an opening edge shape opening at a block surface, sipeing wall surfaces which faces each other on both sides of sipeing comprises one zigzag displacement portion where the zigzag portion is displaced toward one end of a longitudinal direction of the sipeing and another zigzag displacement portion where the zigzag portion is displaced toward the other end of the longitudinal direction, one and another zigzag displacement portions are alternately repeated in a depth direction of the sipeing while substantially maintaining the opening edge shape, and the following formulas are satisfied:

$W1 \geq W2$, and $0.7 \times W2 \geq W3 > 0$.

Wherein $W1$, $W2$ and $W3$ are displacement amounts in a vertical plane which passes through a projection end of the zigzag in the block surface, and intersects perpendicularly with a longitudinal direction of the opening edge shape, $W1$, $W2$ and $W3$ are displacement amounts measured in parallel to the block surface, $W1$ is the displacement amount of the upper zigzag displacement portion, $W3$ is the displacement amount of the bottom zigzag displacement portion, and $W2$ is the displacement amount of the middle zigzag displacement portion located therebetween.

It is suitably possible to satisfy the following formulas:

$L1 \geq L2$, and $0.7 \times L2 > L3 > 0$.

Wherein $L1$, $L2$ and $L3$ are displacement amounts in the longitudinal direction of the opening edge shape, $L1$ is the displacement amount of the upper zigzag displacement portion, $L3$ is the displacement amount of the bottom zigzag displacement portion, and $L2$ is the displacement amount of the middle zigzag displacement portion located therebetween.

According to the sipeing of the MIURA-ori structure of the present invention, the knife blade can be pulled out from the tire more smoothly while highly securing the fall-preventing effect of the block, the producing efficiency of the tire can be enhanced, and bending and damage suppressing effect on the knife blade can further be enhanced.

DETAILED DESCRIPTION OF THE INVENTION

Figure 1:
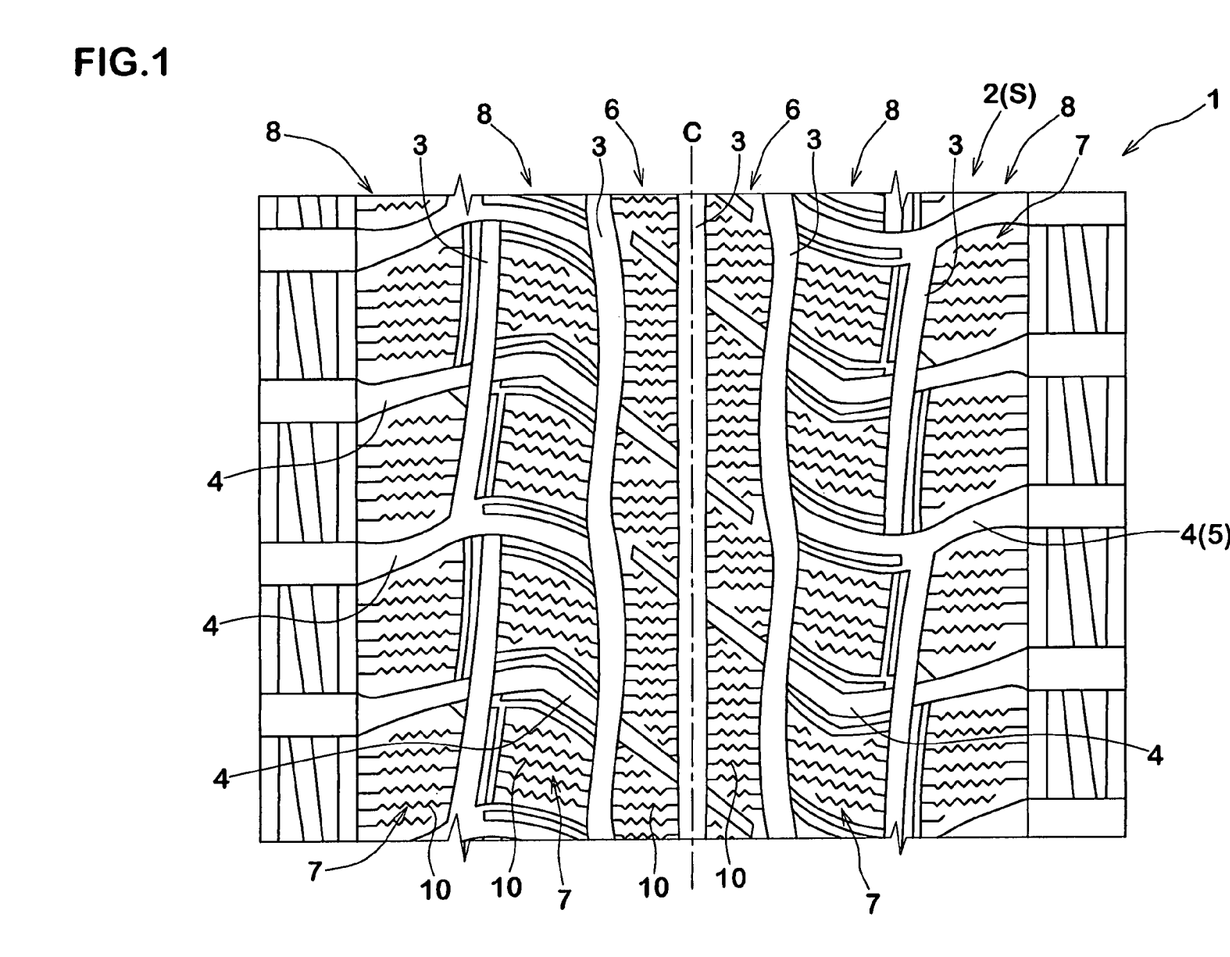
FIG. 1 is a development view showing an embodiment of a tread pattern of a pneumatic tire of the present invention.

An embodiment of the present invention will be explained together with illustrated examples. FIG. 1 is a development view used for explaining a tread pattern when a pneumatic tire of the present invention is a studless tire of a passenger vehicle.

In FIG. 1, a tread portion 2 of a pneumatic tire 1 includes tread groove 5 each having a plurality of vertical main grooves 3 extending in the tire circumferential direction, and horizontal main grooves 4 extending in a direction intersecting with the vertical main grooves 3. With this, the tread portion 2 is divided into two ribs 6 and 6 sandwiching a tire equator C, and two block sequences 8 which are formed on opposite sides of the ribs 6 and 6 and in which blocks 7 are disposed at a distance from one another. The tread pattern may be rib block pattern, or block pattern. It is preferable that the tread groove 5 has a groove width of amount 3.5 to 15.0 mm to enhance dewatering performance.

The block 7 may include a plurality of block with sipeings 10 formed in a block surface S which is a tread surface, and the sipeings 10 are provided side-by-side. In this example, all of the blocks 7 are formed as the block with sipeing. In this embodiment, a plurality of sipeings 10 are provided also in each of the ribs 6 side-by-side.

Figure 2A:
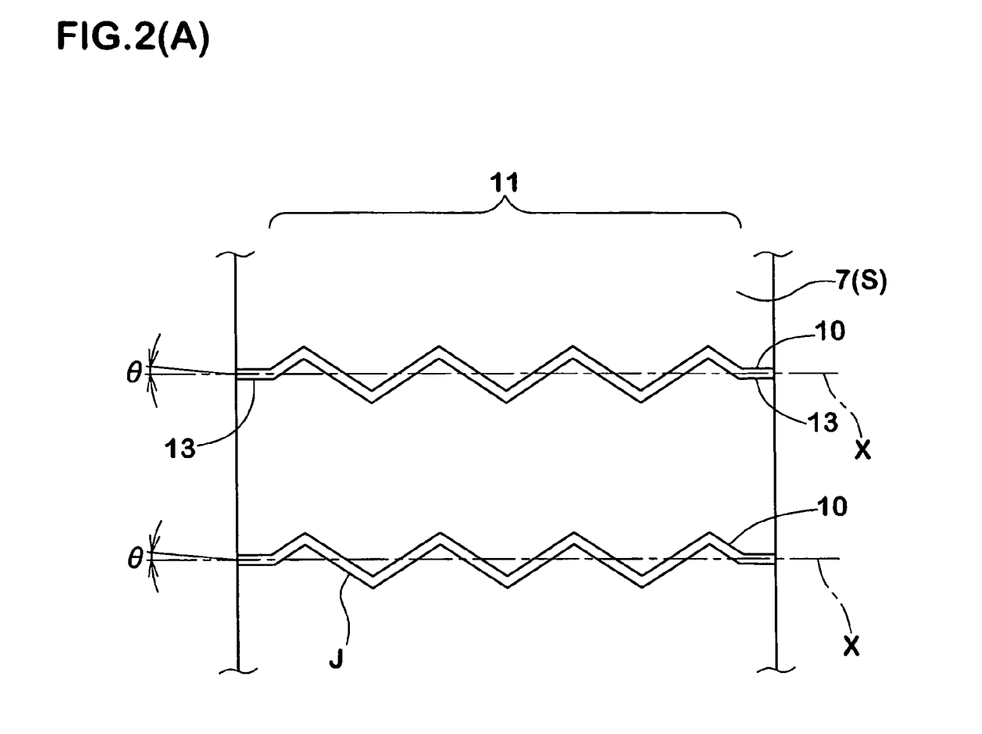
FIG. 2(A) is a plan view used for explaining zigzag opening of a sipeing.
Figure 2B:
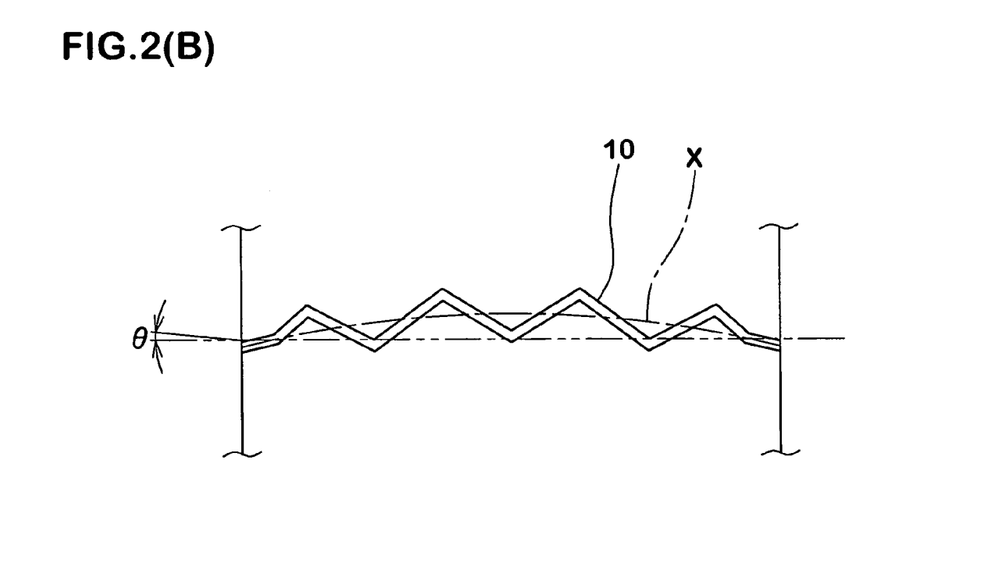
FIG. 2(B) is a plan view used for explaining another example of the zigzag opening.

As shown in FIG. 2(A), in the sipeing 10, an opening edge shape J which opens at the block surface S includes "zigzag portion 11" extending in zigzag form while repeating mountains and valleys on a reference line X on the block surface S. The opening edge shape J may comprise only the zigzag portion 11. The reference line X is an amplitude center of the zigzag shape, and it is preferable that an angle between the reference line X and the axial direction of the tire is set to 20° or less so as to enhance the driving force and braking force on an ice road surface. Although the reference line X is straight in this example, the reference line X may be an arc curved line as shown in FIG. 2(B). In such a case, a straight line connecting both ends of a line segment passing through the zigzag portion 11 of the reference line X forms an angle q of 20° or less with respect to the axial direction of the tire.

The expression that the sipeings 10 are provided "side-by-side" includes a case in which the reference lines X are disposed in parallel to one another, and a case in which the angle between the adjacent reference lines X is 5° or less and they are disposed substantially in parallel to each other. In this example, the sipeing 10 is provided with extending portions 13 at its one end and the other end of the zigzag portion 11. The extending portions 13 is extending straightly (if the reference line X itself is arc in shape, extending in arc form) along the reference line X. One or both of the extending portions 13 may be omitted. Opposite ends of the sipeing 10 are opened at side wall of the block 7 in the axial direction of the tire (open type) in this example, but only one end may be opened (one-side open type), or both end may be closed (closed type).

As the zigzag shape of the zigzag portion 11, it is possible to utilize the shape of mountains and valleys disposed side-by-side using straight line, and a crooked shape such as sawtooth shape in which the length of one zigzag side is short. Further, a curve shape such as sine curve or wave shape can also be employed. However, from a view point of block rigidity, and for largely securing bending rigidity of the sipeing forming knife blade in the tire vulcanization mold, it is preferable that the zigzag shape having shape of mountains and valleys using straight line with the crooking edge of small arc shape.

Figure 3:
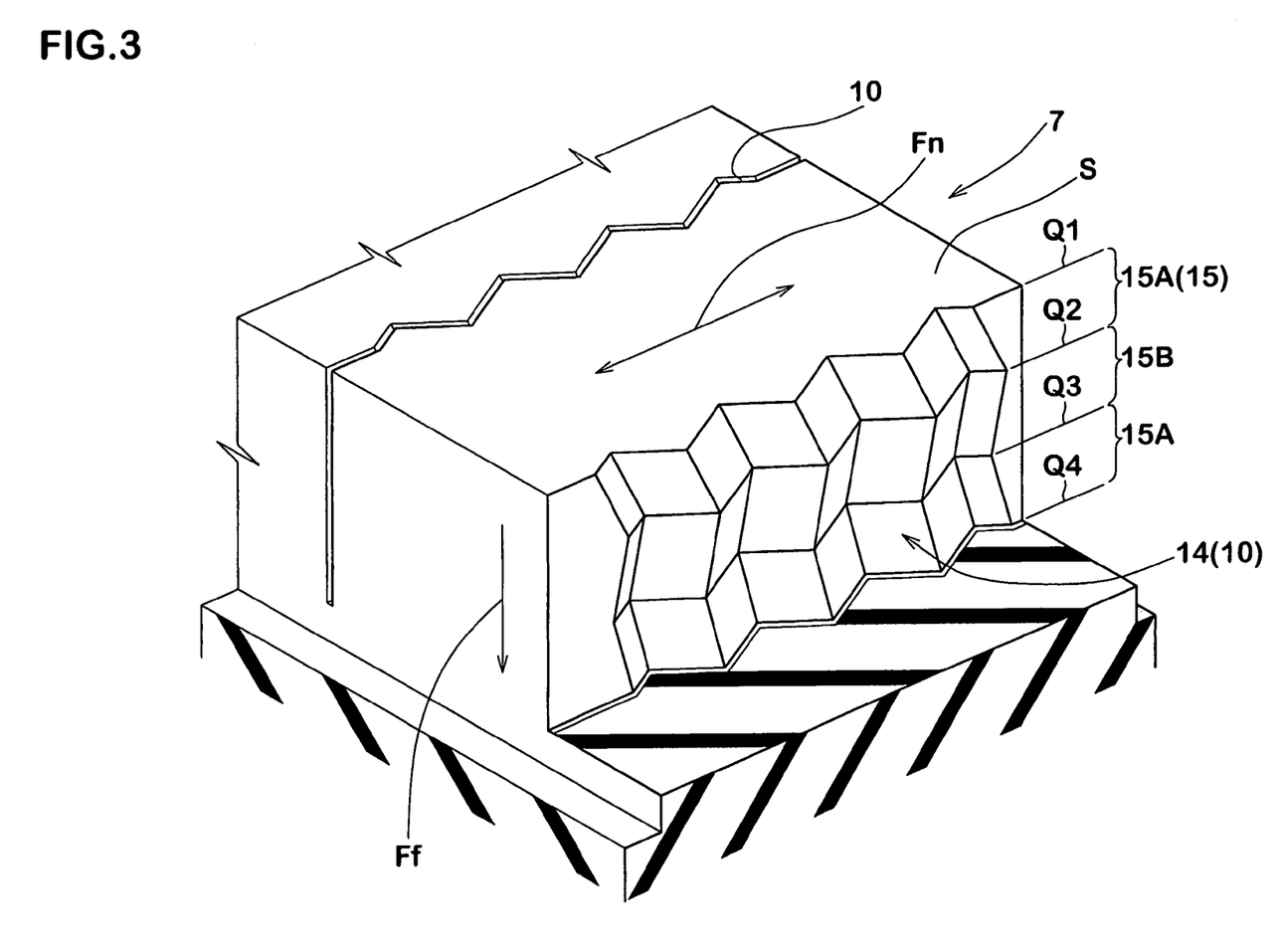
FIG. 3 is a perspective view showing a wall surface of the sipeing.
Figure 4A:
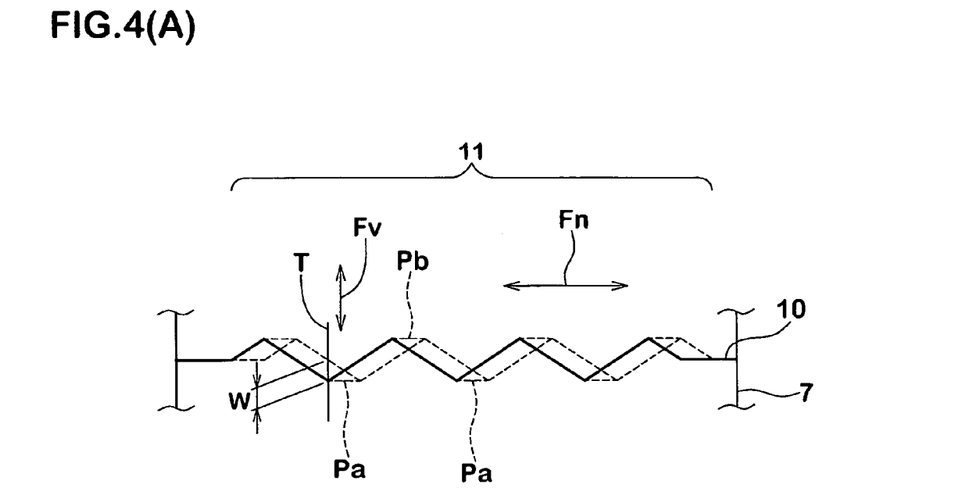
FIG. 4(A) is a plan view showing the wall surface of the sipeing and FIG. 4(B) is a front view thereof.
Figure 4B:
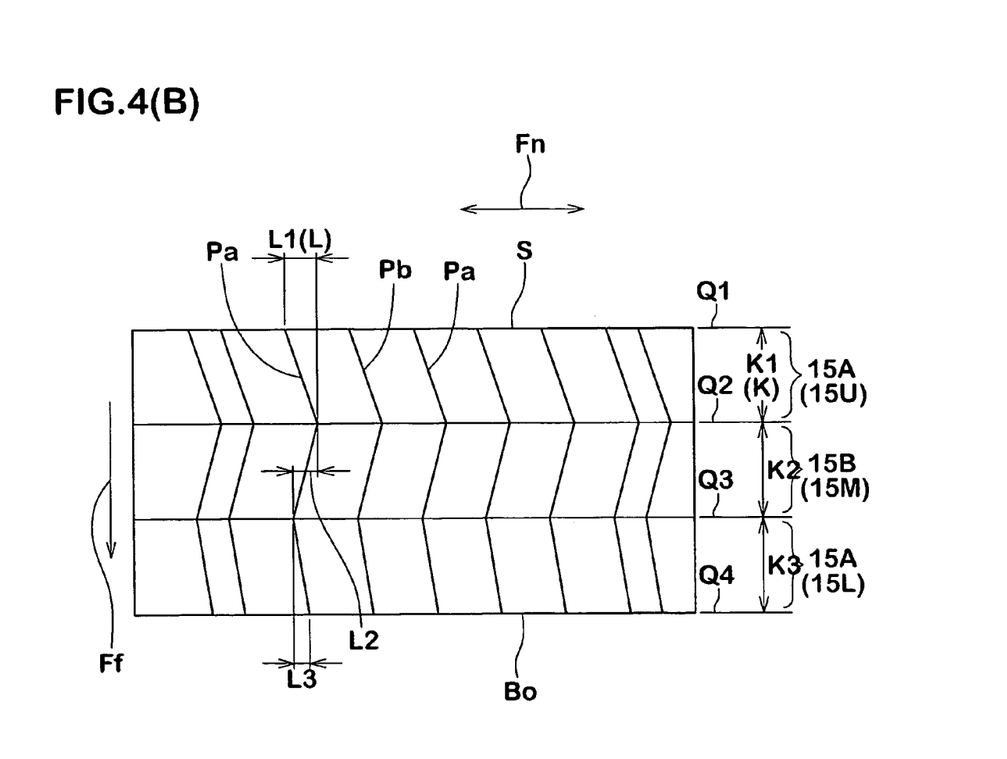

Next, FIG. 3 is a perspective view of a wall surface 14 of the sipeing 10, and FIGS. 4(A) and 4(B) are plane and front views of the wall surface 14. As shown in FIGS. 3 and 4, as a depth Ff of the sipeing 10 is increased, the zigzag portion 11 is displaced in the longitudinal direction Fn while substantially holding the zigzag shape of the zigzag portion 11. Therefore, the wall surface of sipeing 10 is formed by alternately repeating one zigzag displacement portions 15A in a direction in which the zigzag portion 11 is displaced toward one end in the longitudinal direction Fn and another zigzag displacement portions 15B in the opposite direction in which the zigzag portion 11 is displaced toward the other end in the longitudinal direction Fn.

Figure 5:
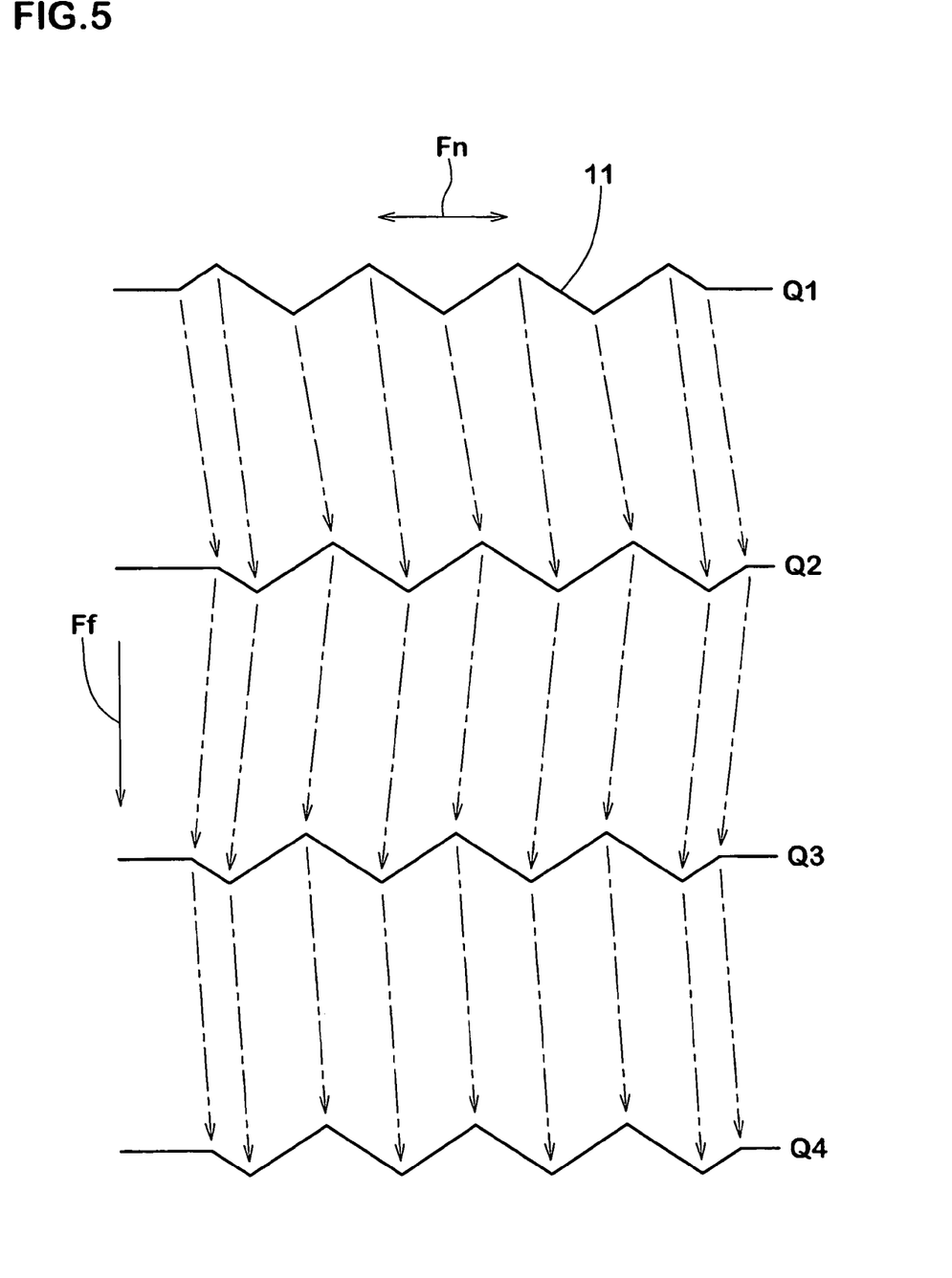
FIG. 5 is a diagram showing a zigzag shape of the sipeing in each depth position.

FIG. 5 schematically shows the sipeing shape at a surface thereof which is in parallel to the block surface S in each of the depth positions Q1 to Q4 shown in FIGS. 3 and 4. The zigzag shapes of the zigzag portion 11 are the same in the depth positions Q1 to Q4, and as the depth of the zigzag portion 11 from the block surface S is increased, the zigzag shape is alternately displaced in the one direction and the other direction in the longitudinal direction Fn. The one zigzag displacement portion 15A in the one direction and another zigzag displacement portion 15B in the other direction are collectively called zigzag displacement portion 15. At that time, a rate of displaced in the longitudinal direction Fn of the zigzag portion 11 is constant in each zigzag displacement portion 15. Therefore, in each zigzag displacement portion 15, ridgelines Pa and Pb of mountains and valleys of the zigzag portion 11 appear as inclined straight lines which are in parallel to each other.

The wall surface of the sipeing 10 includes a total three or more zigzag displacement portions 15 comprising an uppermost zigzag displacement portion 15U on the side of the block surface S, a lowermost zigzag displacement portion 15L on the side of the sipeing bottom Bo, and one or more zigzag displacement portions 15M located therebetween.

As shown in FIG. 3, the wall surface of the sipeing 10 having such a structure is formed as 3D crooked wall surface having three dimensional concavo portions and convex portions. Therefore, opposed wall surfaces 14 and 14 mesh with each other at concavo portions and convex portions and support each other so that it is possible to effectively prevent the block 7 from falling. As a result, the reduction of adhesion and friction force due to the decreasing of the ground-contact area can be suppressed, and the road surface scratching force (edge effect) is enhanced by edge, so that the on-ice performance can be enhanced.

Figure 6A:
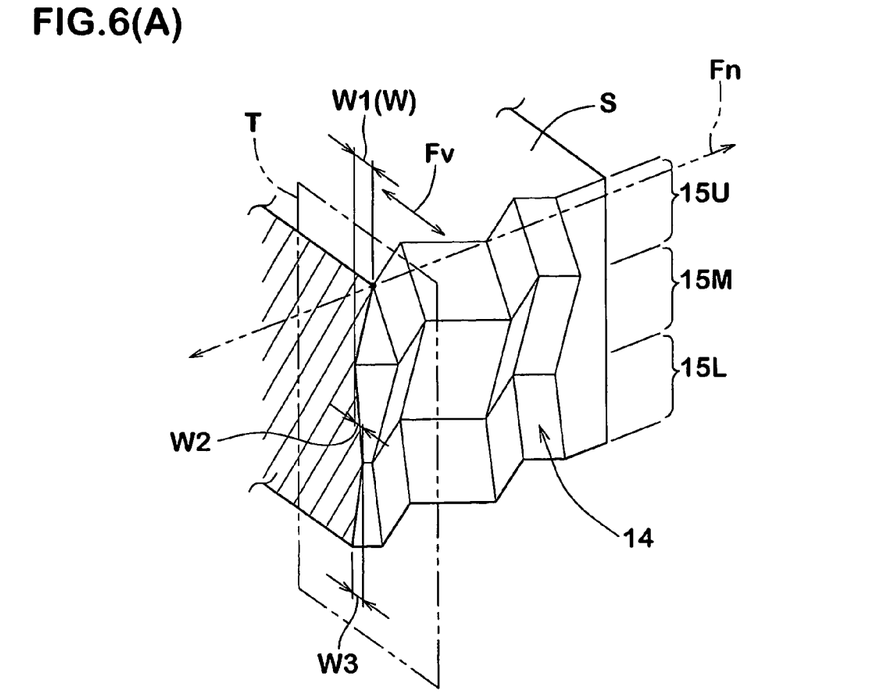
FIG. 6(A) is a perspective view of a wall surface of a sipeing showing a displacement amount in a direction perpendicular to the longitudinal direction in a vertical cross section which intersects with the longitudinal direction at right angles when there are three zigzag displacement portions.
Figure 7:
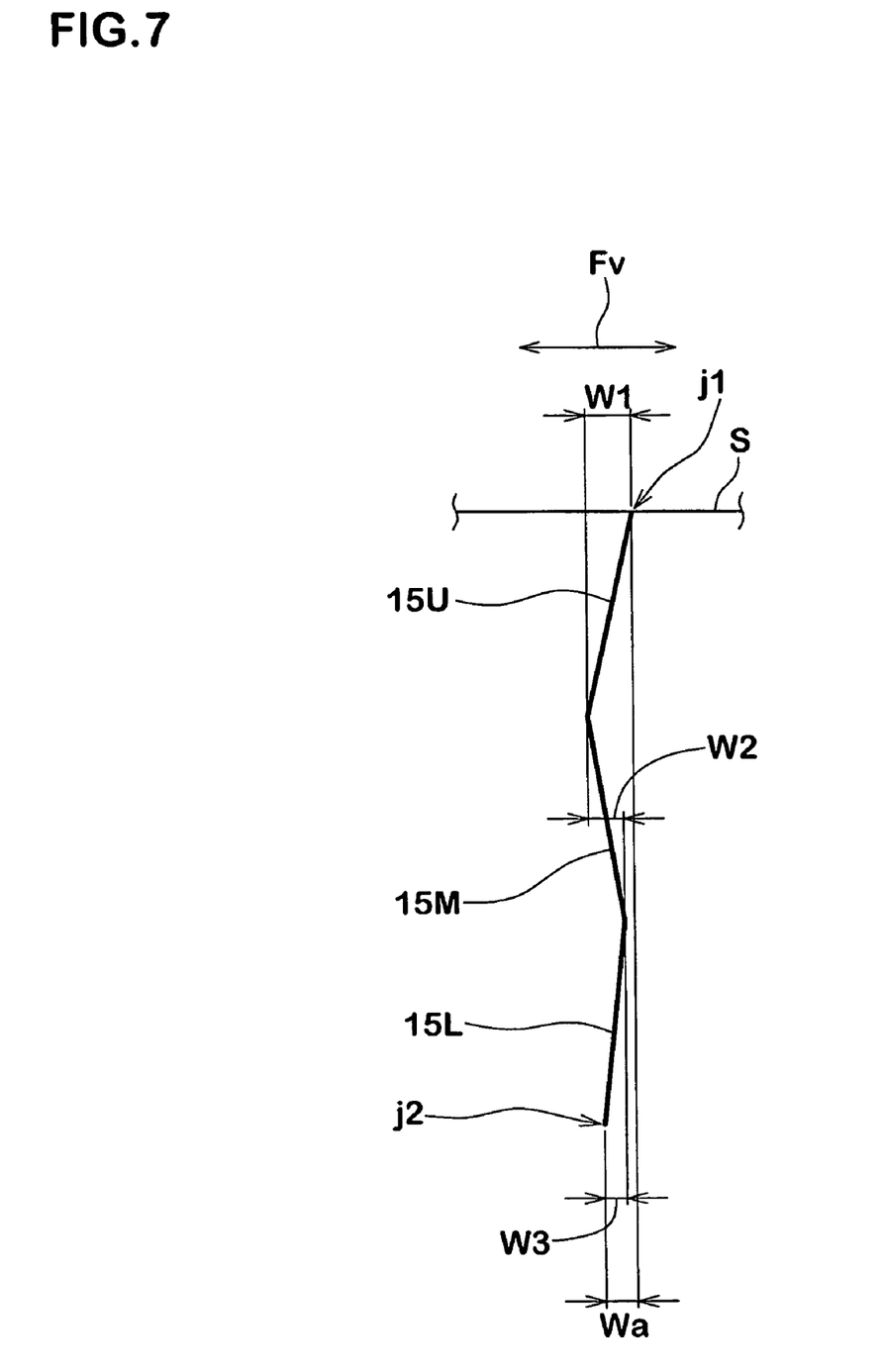
FIG. 7 is a sectional view of a wall surface of a sipeing showing a displacement amount in a direction perpendicular to the longitudinal direction in the vertical cross section which intersects with the longitudinal direction at right angles.

In the present invention, as shown in FIGS. 6(A) and 7, a displacement amount in the amplitude direction Fv of the upper zigzag displacement portion 15U at the side of the block surface S is defined as W1, a displacement amount in the amplitude direction Fv of the zigzag displacement bottom portion 15L on the side of the sipeing bottom Bo is defined as W3, and a displacement amount in the amplitude direction Fv of the intermediate zigzag displacement portion 15M is defined as W2.

W1, W2 and W3 are displacement amounts in a vertical plane (radial plane) which passes through a projection end of the zigzag in the block surface, and the vertical plane intersects perpendicularly with a longitudinal direction of the zigzag portion 11 on the block surface S. And the amplitude direction Fv is measured in parallel to the block surface. And the displacement amounts W1, W2 and W3 satisfies following formulas (1), (2):

$$W1 \geq W2 \quad (1)$$

$$0.7 \times W2 \geq W3 > 0 \quad (2)$$

In another words, as shown in FIGS. 4(A) and 6(A), the displacement amount W of the amplitude direction Fv is defined as a length of the zigzag displacement portions 15U, 15 m and 15L in the amplitude direction Fv in a vertical cross section T (perpendicular to the block surface S) which passes through a peak of the mountain or a bottom point of the valley of the zigzag portion 11 in the block surface S and which intersects with the longitudinal direction Fn.

Figure 6B:
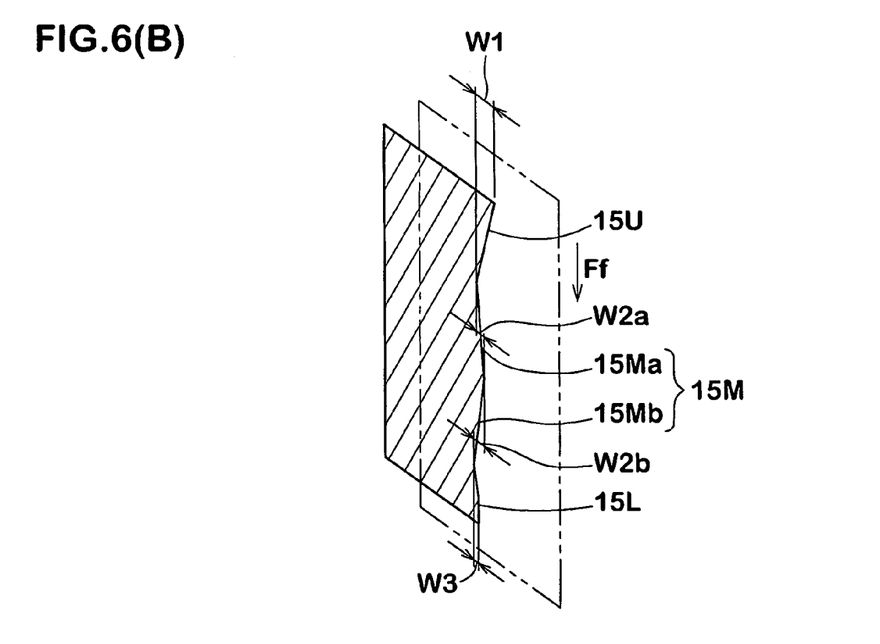
FIG. 6(B) is a perspective view of a similar wall surface when there are four zigzag displacement portions.

Here, when there exist a plurality of intermediate zigzag displacement portions 15M as shown in FIG. 6(B), an average value of displacement amounts W of the intermediate zigzag displacement portions 15M is employed as the "displacement amount W2".

The formulas (1) and (2) mean that the displacement amount W in the amplitude direction Fv is smaller as zigzag displacement portion 15 is closer to the sipeing bottom Bo, and the displacement amount W3 of the lowermost zigzag displacement portion 15L is 0.7 times or less of the displacement amount W2 of the intermediate zigzag displacement portion 15M.

Here, in the zigzag displacement portion 15L on the side of the sipeing bottom Bo, contact pressure between the sipeing wall surfaces 14 when external force is applied to the block 7 is low as compared with other zigzag displacement portions 15U and 15 M. Therefore, falling-suppressing effect on the block is small irrespective of value of the displacement amount W. On the other hand, the zigzag displacement portion 15L on the side of the sipeing bottom Bo is close to a portion having high rigidity such as a tread reinforcing cord layer (e.g., band layer and belt layer) and a tread base rubber, and has a long distance from the block surface S. Thus, the zigzag displacement portion 15L has great effect on pulling-out performance of the sipeing forming knife blade from the tire and bending performance.

Therefore, in the zigzag displacement portions 15U to 15L, by satisfying the expressions (1) and (2), the falling-suppressing effect on the block is exhibited to the utmost, and the pulling-out of the knife blade from tire can more smoothly be carried out. Further, the producing efficiency of tire can be enhanced, and it is possible to effectively prevent the knife blade from being bent and damaged. If the displacement amount W3 of the lowermost zigzag displacement portion 15L is 0, the falling-suppressing effect of block in the intermediate zigzag displacement portion 15M may be deteriorated in some cases, and W3 is higher than 0, preferably 5% of W2 or higher, and more preferably 10% or higher. It is also preferable that the displacement amount W3 is 50% of the displacement amount W2 or lower, and more preferably 20% or lower.

To exhibit the effect, at least three or more, three to five for example, zigzag displacement portions 15 are formed. In order to further enhance the effect, the displacement amount W1 should be set greater than the displacement amount W2. It is preferable that the displacement amount W2 is 70% of the displacement amount W1 or higher. The displacement amount W2 can be 80% or higher to 90% or higher of the displacement amount W1.

Following formulas are also available:

$$W1 > W2 \quad (1)$$

$$0.7 \times W2 > W3 > 0 \quad (2)$$

When there exist a plurality of intermediate zigzag displacement portions 15M, as shown in FIG. 6(B) for example, it is preferable that when two intermediate zigzag displacement portions 15M are adjacent in the depth direction Ff, and shallower one of them is defined as 15Ma and deeper one is defined as 15Mb, the displacement amounts W2$a$ and W2$b$ are set to satisfy the relation of W2$a$>W2$b$. In the case of a tire for a passenger vehicle, 1.0 to 1.8 mm is a general value.

Next, the displacement amount W in the amplitude direction Fv can be varied by varying the displacement amount L of the zigzag displacement portion 15 in the longitudinal direction Fn. That is, in this example, if the displacement amount of the zigzag displacement portion 15U in the longitudinal direction Fn is defined as L1, and the displacement amount of the zigzag displacement portion 15M in the longitudinal direction Fn is defined as L2, and the displacement amount of the zigzag displacement portion 15L in the longitudinal direction Fn is defined as L3, the following expressions (3) and (4) are satisfied.

$$L1 > L2 \quad (3)$$

$$0.7 \times L2 \geq L3 > 0 \quad (4)$$

With this, the expressions (3) and (4) can be set. It is preferable that the displacement amount L1 is greater than the displacement amount L2, and the displacement amount L2 is 70% of the displacement amount L1 or higher, and especially 80% or higher and most preferably 90% or higher. It is also preferable that the displacement amount L3 is 50% of the displacement amount L2 or lower, and 20% or lower. It is preferable that the displacement amount L3 is 5% of the displacement amount L2 or higher. Like the displacement amount W2, when there exist a plurality of intermediate zigzag displacement portions 15M, an average value of the displacement amounts L of the intermediate zigzag displacement portions 15M is employed as the displacement amount L2.

Figure 8:
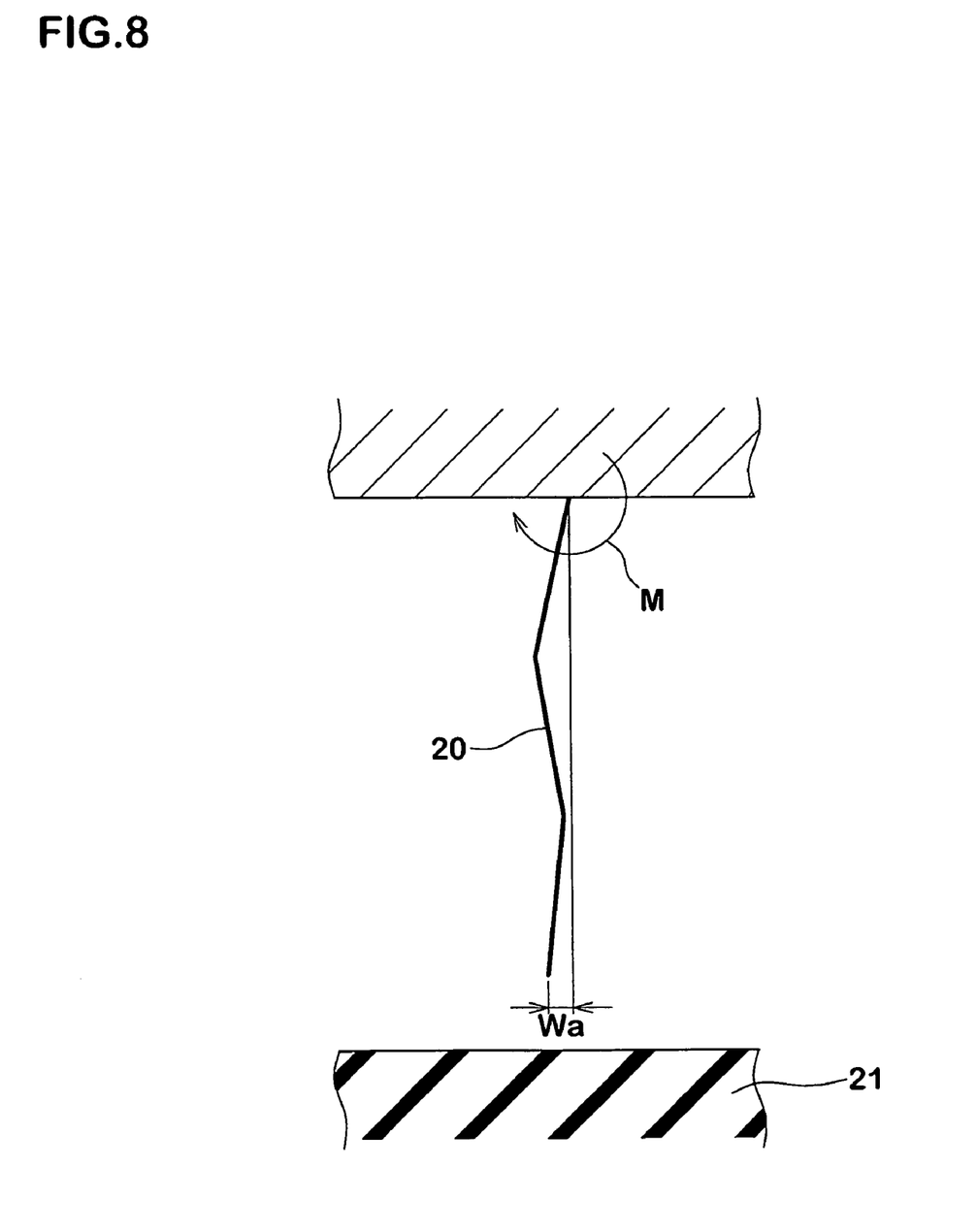
FIG. 8 is a sectional view used for explaining bending deformation when the knife blade is embedded.

In the sipeing 10, as shown in FIGS. 7 and 8, a distance Wa between a projection groove j1 in the block surface S and a lower point j2 at the sipeing bottom Bo in a vertical cross section T (perpendicular also to the block surface S) which passes through a peak of the mountain or a bottom point of the valley of the zigzag portion 11 in the block surface S (projection end of zigzag, peak of the mountain in this example) is set to 70% of the displacement amount W1 or lower.

When a tire is formed by vulcanization, as shown in FIG. 8, the knife blade 20 is embedded into a tread rubber 21 of raw tire. At that time, bending moment M which is proportional to the distance Wa is applied to a root of the knife blade 20. Therefore, if the distance Wa is set to 70% or lower, preferably 50% or lower of the displacement amount W1, the bending moment can be reduced, and damage such as bending of the knife blade can be prevented not only when the knife blade is pulled out from the tire but also when the knife blade is embedded.

In the sipeing 10, to uniformalize the rigidities of the blocks 7 and internal stress when the knife blade 20 is pulled out, it is preferable that distances K1 to K3 in the depth direction (shown in FIG. 4) of the zigzag displacement portions 15 are set equal to each other.

Although the especially preferable embodiment of the present invention has been described, the invention is not limited to the embodiment, and the invention can be variously be modified and carried out.

EXAMPLES

Studless tires (size 195/65R15) for a passenger vehicle having block pattern comprising four block lines using a rectangular block were produced based on specification shown in Table 1. Block rigidities of the blocks and pulling-out resistance of the knife blade were measured. The rectangular block has size of 15 mm (width in axial direction of the tire)×20 mm (length in circumferential direction of the tire)×10 mm (height). Four 3D sipeings having 0.3 mm (sipeing width)×9.0 mm (sipeing depth) are formed in each block surface at equal distances from one another. The opening edge shapes on the block surface are the same in all tires, and the zigzag amplitude of the zigzag shape is 1.3 mm, and zigzag pitch is 3.6 mm.

(1) Block Rigidity

Normal internal pressure was charged into the prototyped tire, vertical load of 0.0274 kgf/mm$^2$ was applied to the block surface, the road surface was displaced from 0 mm to 3.0 mm in the circumferential direction of the tire, and reaction force at that time was measured. The block rigidity was obtained by dividing the reaction force at the time of 3.0 mm displacement by the displacement (3.0 mm), and the block rigidity is indicated with index defining the conventional example as 100. As the value is greater, the rigidity is higher.

(2) Pulling-Out Resistance of Knife Blade

A knife blade was set in a raw block, vulcanization was carried out, the knife blade was pulled in a direction perpendicular to the block surface, and the maximum tensile force required until the knife blade was pulled out is indicated with index while defining the conventional example as 100. As the value is smaller, the resistance is lower.

TABLE 1

|  | Conventional example | Comparative example 1 | Example 1 | Example 2 | Example 3 | Example 4 |
|---|---|---|---|---|---|---|
| Sipeing wall surface | 3D (FIG. 9) | 3D (FIG. 6) | 3D (FIG. 6) | 3D (FIG. 6) | 3D (FIG. 6) | 3D (FIG. 6) |
| Zigzag displacement portion |  |  |  |  |  |  |
| Number | 3 | 3 | 3 | 3 | 3 | 3 |
| Displacement amount in amplitude direction |  |  |  |  |  |  |
| W1 <mm> | 1.4 | 0.7 | 1.6 | 1.4 | 1.4 | 1.4 |
| W2 <mm> | 1.4 | 1.4 | 1.4 | 1.4 | 1.4 | 1.4 |
| W3 <mm> | 1.4 | 0.7 | 0.2 | 0.1 | 0.7 | 0.1 |
| Wa <mm> | 0.14 | 0 | 0.4 | 0.1 | 0.7 | 0.1 |
| (Ratio W2/W1) | 1.0 | 2.0 | 0.88 | 1.0 | 1.0 | 1.0 |
| (Ratio W3/W2) | 1.0 | 0.5 | 0.14 | 0.07 | 0.5 | 0.07 |
| Displacement amount in longitudinal direction |  |  |  |  |  |  |
| L1 <mm> | 1.8 | 0.9 | 2.1 | 1.8 | 1.8 | 1.8 |
| L2 <mm> | 1.8 | 1.8 | 1.8 | 1.8 | 1.8 | 1.8 |
| L3 <mm> | 1.8 | 0.9 | 0.3 | 0.13 | 0.9 | 0.13 |
| (Ratio L2/L1) | 0 | 2.0 | 0.86 | 1.0 | 1.0 | 1.0 |
| (Ratio L3/L2) | 0 | 0.5 | 0.17 | 0.07 | 0.5 | 0.07 |
| Distance in depth direction |  |  |  |  |  |  |
| K1 <mm> | 3 | 3 | 3 | 3 | 3 | 2 |
| K2 <mm> | 3 | 3 | 3 | 3 | 3 | 3 |
| K3 <mm> | 3 | 3 | 3 | 3 | 3 | 4 |
| Block rigidity | 100 | 85 | 99 | 97 | 97 | 94 |
| Pulling-out resistance of blade | 100 | 66 | 69 | 62 | 79 | 61 |

What is claimed is:

1. A pneumatic tire having blocks which are divided by tread grooves and which include a plurality of sipeings provided side-by-side, wherein each of said sipeings has:
   an opening which opens at a block surface and has a zigzag portion which extends in a zigzag form while repeating mountains and valleys, and
   sipeing wall surfaces which face each other on both sides of sipeing and which comprise one zigzag displacement portion where the zigzag portion is displaced toward one end of a longitudinal direction of the sipeing and another zigzag displacement portion where the zigzag portion is displaced toward the other end of the longitudinal direction,
   said one zigzag displacement portion and said another zigzag displacement portion are alternately repeated in a depth direction of the sipeing while substantially maintaining the shape of said zigzag portion, and wherein the following formulas are satisfied:

$W1 \geq W2$, and $0.7 \times W2 \geq W3 > 0$ wherein W1, W2 and W3 are displacement amounts in a vertical plane which passes through a projection end of the zigzag in the block surface, and intersects perpendicularly with a longitudinal direction of the opening,
   W1, W2 and W3 are displacement amounts measured in parallel to the block surface,
   W1 is the displacement amount of the upper zigzag displacement portion,
   W3 is the displacement amount of the bottom zigzag displacement portion, and
   W2 is the displacement amount of the middle zigzag displacement portion located therebetween, and wherein the following formulas are further satisfied:

$L1 \geq L2$, and $0.7 \times L2 \geq L3 > 0$ wherein L1, L2 and L3 are displacement amounts in the longitudinal direction of the zigzag portion,
   L1 is the displacement amount of the upper zigzag displacement portion,
   L3 is the displacement amount of the bottom zigzag displacement portion, and
   L2 is the displacement amount of the middle zigzag displacement portion located therebetween.

2. The pneumatic tire according to claim 1, wherein a distance Wa between said projection end of the zigzag at the block surface and a bottom point of the bottom zigzag displacement portion, in parallel to the block surface in said vertical cross section is 70% of the displacement amount W1 or less.

3. The pneumatic tire according to claim 1, wherein a vertical distances K of each zigzag displacement portions in the depth direction are equal to each other.

4. The pneumatic the according to claim 2, wherein a vertical distances K of each zigzag displacement portions in the depth direction are equal to each other.

* * * * *